United States Patent
Yao et al.

(10) Patent No.: US 10,677,631 B2
(45) Date of Patent: Jun. 9, 2020

(54) GAS METER FOR SUBMERGED USE

(71) Applicant: Natural Gas Solutions North America, LLC, Houston, TX (US)

(72) Inventors: Richard Jin Yao, Houston, TX (US); Robert Erling Fowler, Houston, TX (US); Jeff Thomas Martin, Houston, TX (US); Ronald Lewis Strong, Sealy, TX (US)

(73) Assignee: Natural Gas Solutions North America, LLC, Houston, TX (US)

( * ) Notice: Subject to any disclaimer, the term of this patent is extended or adjusted under 35 U.S.C. 154(b) by 286 days.

(21) Appl. No.: 15/452,795

(22) Filed: Mar. 8, 2017

(65) Prior Publication Data

US 2018/0259378 A1  Sep. 13, 2018

(51) Int. Cl.
*G01F 15/14* (2006.01)
*G01D 11/24* (2006.01)
*G01F 3/10* (2006.01)

(52) U.S. Cl.
CPC ........... *G01F 15/14* (2013.01); *G01D 11/245* (2013.01); *G01F 3/10* (2013.01)

(58) Field of Classification Search
CPC .......... G01D 11/245; G01F 15/14; G01F 3/10
USPC ...................................... 73/861.77
See application file for complete search history.

(56) References Cited

U.S. PATENT DOCUMENTS

| | | | | |
|---|---|---|---|---|
| 3,742,233 A * | 6/1973 | Gorgens | ................... | G01D 5/34 250/231.14 |
| 4,109,521 A * | 8/1978 | Youmans | ................ | E21B 23/14 73/152.17 |
| 4,553,433 A * | 11/1985 | Hicks | ...................... | G01F 15/14 73/273 |
| 4,836,296 A * | 6/1989 | Biek | ........................ | B25B 21/02 173/93.5 |
| 6,982,651 B2 | 1/2006 | Fischer | | |
| 7,181,980 B2 | 2/2007 | Wium | | |
| 7,212,953 B1 * | 5/2007 | Artiuch | ...................... | G01F 1/05 702/100 |

(Continued)

OTHER PUBLICATIONS

Gregerson et al., New Developments in Wet Gas Metering to Meet Offshore Challenges, Paper, Apr. 30-May 3, 2012, Offshore Technology Conference, Houston, tX.

*Primary Examiner* — Peter J Macchiarolo
*Assistant Examiner* — Mohammed E Keramet-Amircolai
(74) *Attorney, Agent, or Firm* — Paul Frank + Collins P.C.

(57) ABSTRACT

A gas meter (100) and like metering systems that are configured for use underwater. The gas meter may embody a positive displacement rotary gas meter having a meter body with impellers that counter-rotate in response to material flow. The gas meter can also comprise an index unit having an electronics assembly to generate a value that equates rotation of impellers with a parameter of the material flow. The gas meter can further comprise a connective interface having a first part and a second part, one each disposed on the meter unit and the index unit, respectively, the first part and the second part coupling with one another to provide data to the electronics assembly, the data corresponding with operating conditions on the meter unit and rotation of the impellers. In one example, the first part and the second part are configured so that the meter unit and the index unit are operable underwater to generate the value.

19 Claims, 10 Drawing Sheets

(56) References Cited

U.S. PATENT DOCUMENTS

| | | | |
|---|---|---|---|
| 7,963,423 B2* | 6/2011 | Sassner | B67D 7/222 |
| | | | 222/14 |
| 7,974,741 B2* | 7/2011 | Watson | G06Q 10/08 |
| | | | 137/2 |
| 8,479,571 B2 | 7/2013 | Zollo et al. | |
| 9,170,140 B2 | 10/2015 | Brown et al. | |
| 2003/0167919 A1* | 9/2003 | Schempf | F17D 3/01 |
| | | | 95/15 |
| 2006/0032303 A1* | 2/2006 | Smich | G01F 3/10 |
| | | | 73/261 |
| 2009/0078523 A1* | 3/2009 | Grzeslo | F16D 41/066 |
| | | | 192/45.02 |
| 2009/0187356 A1* | 7/2009 | Artiuch | G01F 25/0053 |
| | | | 702/45 |
| 2009/0301185 A1* | 12/2009 | Duk | G01C 22/00 |
| | | | 73/198 |
| 2012/0000281 A1* | 1/2012 | Vo | G01F 3/06 |
| | | | 73/272 R |
| 2012/0103086 A1* | 5/2012 | Goka | G01F 1/6842 |
| | | | 73/204.26 |
| 2014/0137664 A1* | 5/2014 | Figurski | G01C 13/002 |
| | | | 73/861.77 |
| 2015/0135823 A1* | 5/2015 | Tokuyasu | F02D 41/18 |
| | | | 73/204.13 |
| 2015/0308870 A1 | 10/2015 | Gottlieb et al. | |
| 2015/0337977 A1* | 11/2015 | Canning | F16K 17/36 |
| | | | 251/14 |
| 2016/0042269 A1* | 2/2016 | Wang | G01F 1/07 |
| | | | 346/33 R |
| 2016/0146651 A1* | 5/2016 | Isoya | G01F 1/684 |
| | | | 73/114.34 |
| 2017/0074702 A1* | 3/2017 | Triaca | G01F 3/226 |
| 2018/0023983 A1* | 1/2018 | Watanabe | G01F 1/684 |
| | | | 73/431 |

* cited by examiner

GAS METER FOR SUBMERGED USE

BACKGROUND

Metrology hardware finds use across a wide range of applications. For example, the fuel gas industry uses metering systems, or flow meters, to measure consumption, bill customers, and manage inventory. Some of these flow meters are mechanical, positive-displacement devices. Rotary-types of these devices may include an impeller that rotates in response to flow of gas. In other types, the flow of gas translates a diaphragm or bellows. Other mechanical devices may leverage a turbine or like rotating element (e.g., a pinwheel). In use, the flow meter (or collateral system) can monitor movement of the working mechanism to quantify the amount of gas. Some flow meters may be electronic, using technology like hotwire, ultrasound, or lasers to measure the amount of gas. But, while both mechanical and electronic flow meters are proven to be very accurate, reliable, and typically require little or no maintenance, these devices are generally only operable in certain environments or conditions, namely, those in which the device is to remain dry or would not be submerged in fluids.

SUMMARY

The subject matter of this disclosure is useful to configure metering systems to operate underwater or submerged in fluids for extended periods of time. These improvements may broaden use of the system to areas susceptible to groundwater seepage, runoff, floods, or other typical or atypical events that could submerge the device in whole or in part. Some embodiments are arranged as positive displacement rotary gas meters with a mechanical unit and an electronic unit that work together to measure flow volume of gas. These embodiments may employ a connective interface that protects components interior to both of the units should the gas meter become submerged due to, for example, high water levels that result from flooding. As an added benefit, however, this interface also creates a "modular" structure for the meter. This modular structure can allow the units to separate from one another. In the field, this feature permits the electronic unit to remove from the mechanical unit without the need to remove the mechanical unit from a piping set or stop flow of gas into the meter.

BRIEF DESCRIPTION OF THE DRAWINGS

Reference is now made briefly to the accompanying figures, in which.

Figure 1:
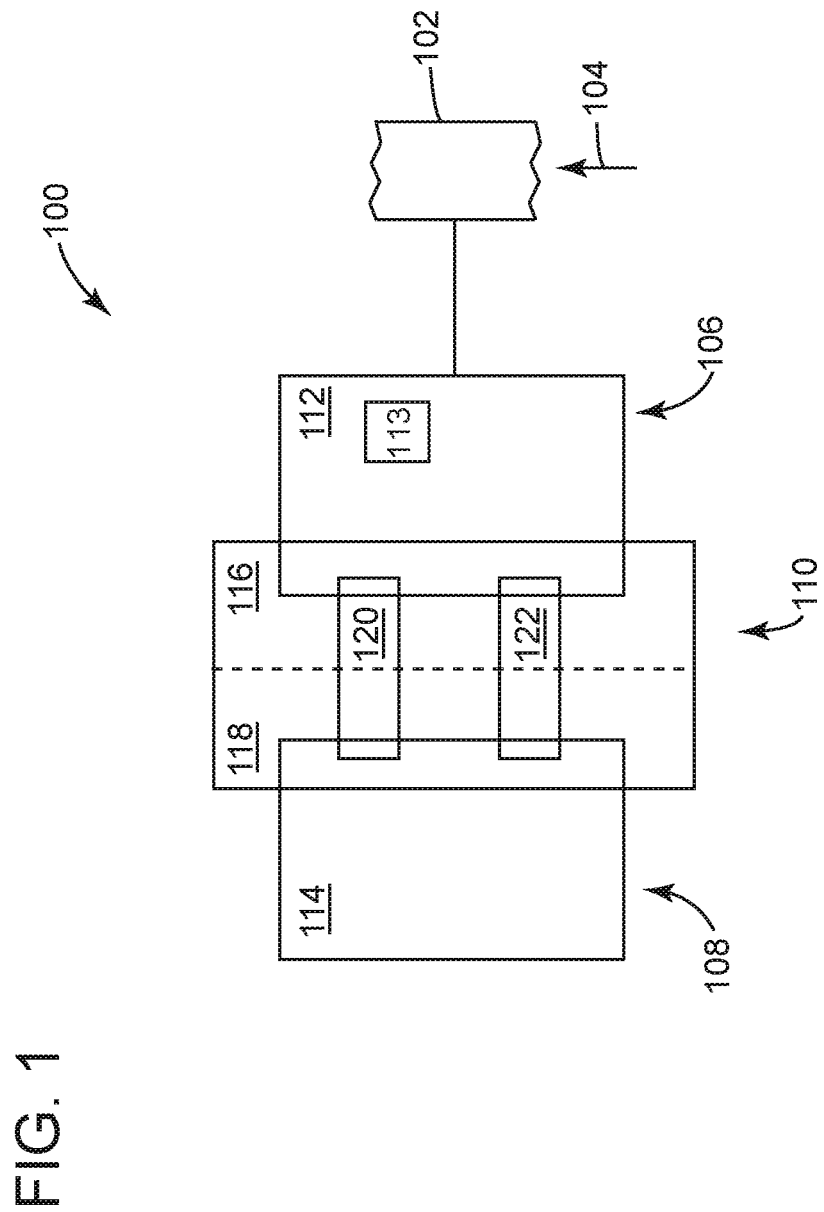
FIG. 1 depicts a schematic diagram of an exemplary embodiment of a metering system.

Where applicable like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The embodiments disclosed herein employ structure amenable to applications atypical for gas meters and related metrology devices. The structure may be water-tight to allow these devices to operate underwater or submerged in fluids (at depths of at least five (5) feet or more). For metrology, devices with this feature find use at locations that might be prone to periodic (or regular) floods or high-water. The structure also compartmentalizes certain functions into constituent components that readily connect and disconnect with one another. For example, the structure may separate data processing and measurement functions into separate or individual water-tight components. This feature creates a "modular" structure that, for metrology devices, may be particularly salient to perform maintenance on devices in the field when only one constituent component of the device needs to be replaced or repaired to restore operations. The structure may also allow for the constituent components to assume various configurations, namely, to allow the constituent components to orient relative to one another. In this way, the hardware can be arranged for different orientations and functions at the location or for its particular application.

FIG. 1 illustrates a schematic diagram of an exemplary embodiment of a metering system 100. This embodiment may couple with a conduit 102 that carries material 104. Examples of material 104 may include fluids (e.g., liquids and gases). In one implementation, the metering system 100 may embody a gas meter or like metrology hardware. This type of hardware may be configured to measure defined volumes of gas flow. In turn, these measurements can be used to quantify (and often bill) consumers at residential, commercial, industrial, and municipal locations.

The metering system 100 may integrate functions to convey information that relates to the material 104. This information may define measured parameters for material 104, for example, flow rate, volume, pressure, temperature, and gas composition; however, this listing of parameters is not exhaustive as relates to applications of the subject matter herein. The functions may reside on one or more constituent components (e.g., a first component 106 and a second component 108). A connective interface 110 may be used to convey information (e.g., signals) between the components 106, 108. The first component 106 (also "metrology component 106") may include a meter unit 112 with a measurement device 113. Examples of the measurement device 113 may be embodied as one or more devices, mechanical or electronic, that can quantify parameters of flow of material 104 in the conduit 102. These devices may include impellers, bellows, diaphragms, rotary elements (e.g., turbines), sensors, hotwires, ultrasonics, and optical elements (e.g., lasers). Although shown separate from the conduit 102, the meter unit 112 may be configured to connect to the conduit 102, often in-line using flanges or fittings that are common for pipe connections. The second component 108 (also, "processing component 108") may include an index unit 114 that can process signals from the meter unit 112. The processes may result in values for the measured parameters among other functions. The connective interface 110 may include two parts (e.g., a first part 116 and a second part 118), one each disposed on the meter unit 112 and the index unit 114. The parts 116, 118 may form certain connective structure (e.g., a first connective structure 120 and a second connective structure 122) that are useful to maintain the watertight and modular structure of the metering system 100.

At a high level, the connective interface 110 may be configured to facilitate the water-tight, modular structure for the metering system 100. The parts 116, 118 that are resident on each unit 112, 114 may manifest as physical structure (e.g., bosses, protrusions, etc.). The parts 116, 118 may also comprise components (e.g., sensors, connectors, etc.) that implement one of the connective structures 120, 122 and, in one example, couple with complimentary components on the other one of the connective structures 120, 122 to complete a circuit or like data transfer element.

The first watertight connective structure 120 may facilitate data transfer between the meter unit 112 and the index unit 114. The structure may embody watertight docking connectors and collateral devices (e.g., cables, circuit boards with discrete devices like transistors, capacitors, etc.). Such devices may use "matched" female and male connectors, for example, that mate with one another for this purpose. Exemplary connectors may connect and disconnect without tools or excessive manipulation by an end user (e.g., technician). This feature may help facilitate rapid assembly and repair of the metering system 100, if necessary.

The second watertight connective structure 122 may embody sensors that measure (or quantify) mechanical motion through non-contact or near-field sensing (NFS). Exemplary non-contact or NFS sensors may leverage magnetic, inductive, ultrasonic, photoelectric, capacitive, and like technologies that may generate and detect fields that transit through materials; however, other technologies developed after filing of this application may also be acceptable for use in the metering system 100. Use of such technology is desirable to maintain the integrity of housings that enclose any working components of the units 112, 114 because the devices do not require physical contact. These housings are preferably configured to prevent fluid penetration in order to maintain the water-tight design.

Figure 2:
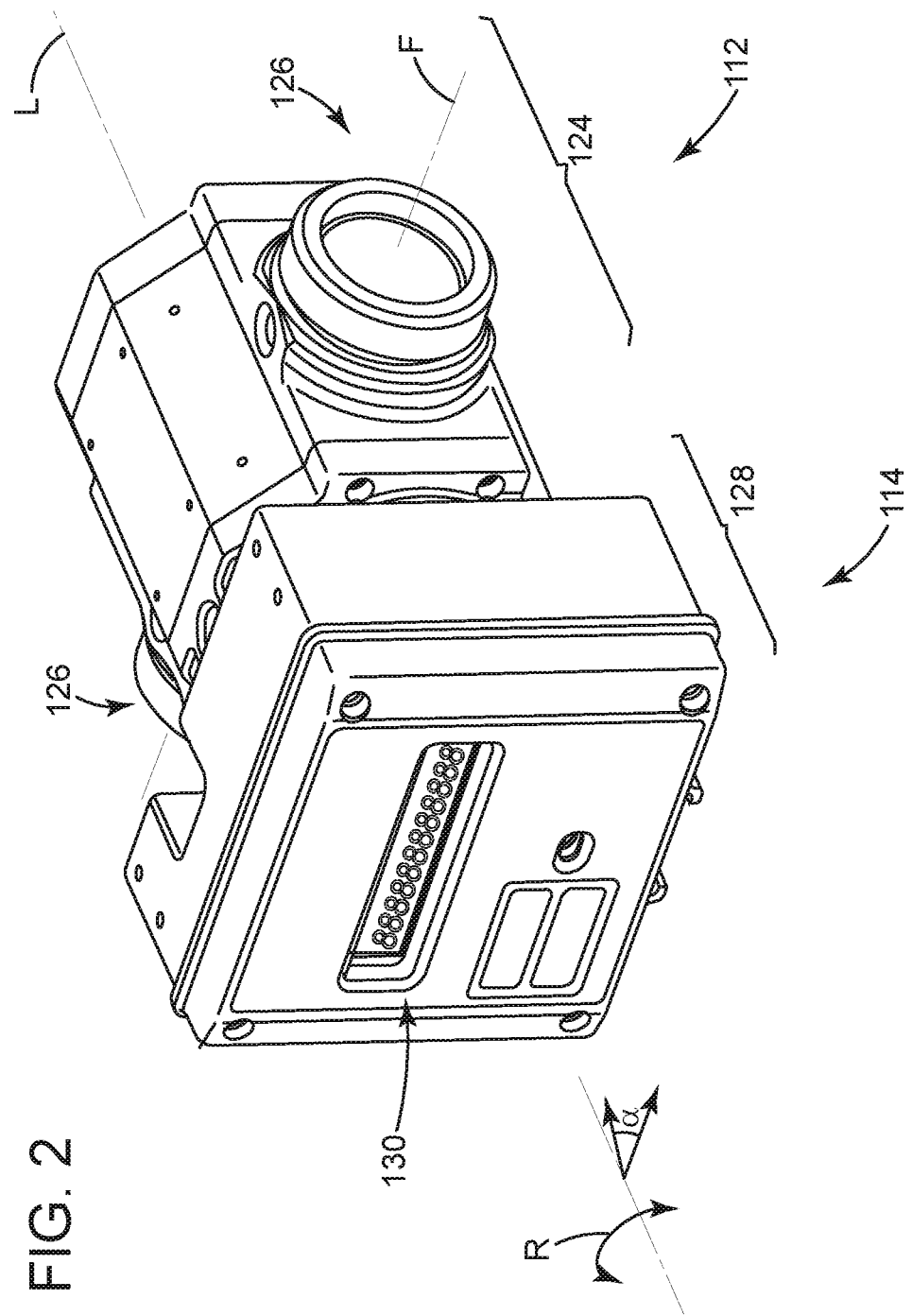
FIG. 2 depicts a perspective view of the front of an example of the metering system of FIG. 1 in assembled form.
Figure 3:
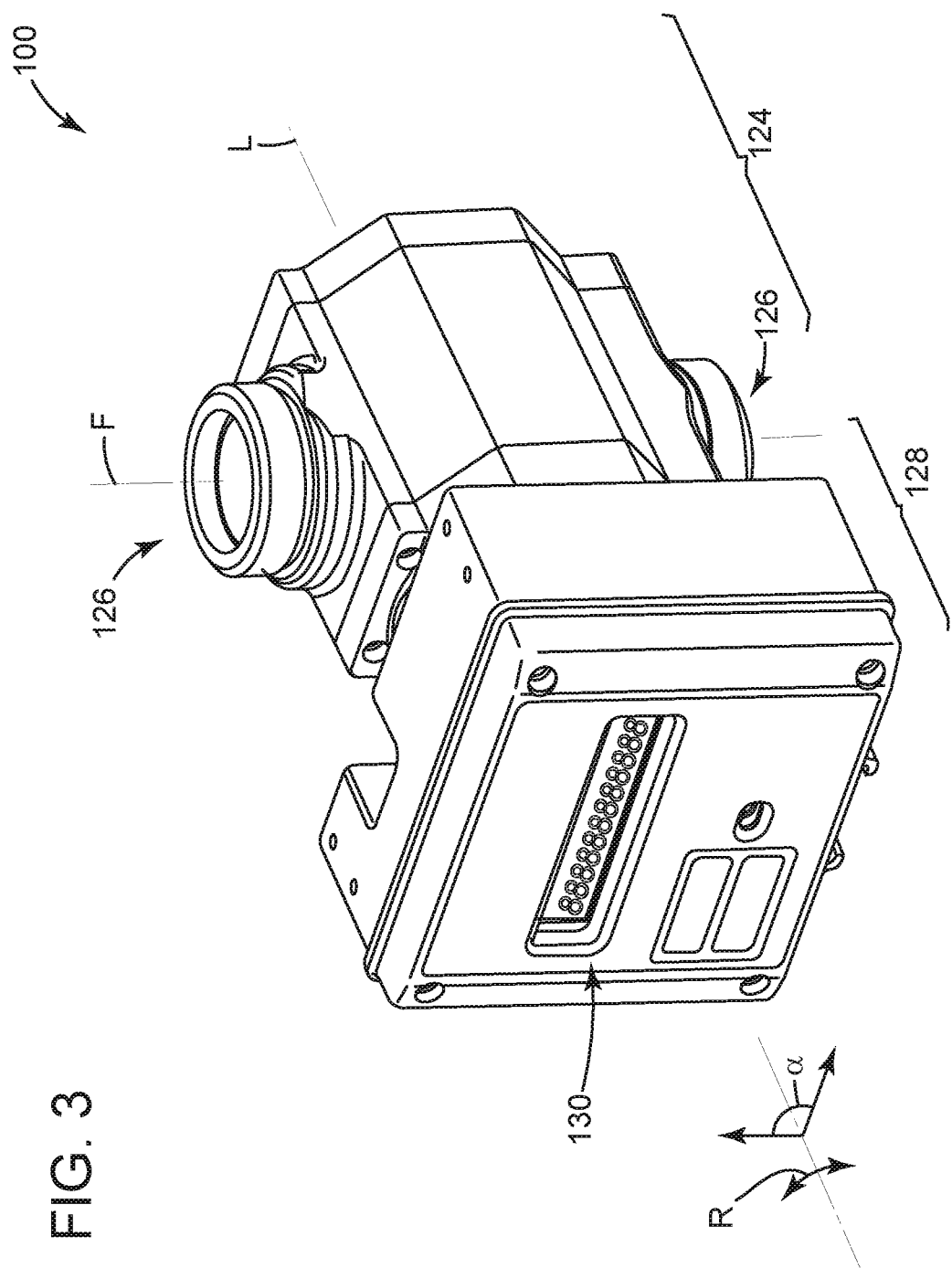
FIG. 3 depicts a perspective view of the front of the exemplary metering system of FIG. 2 in assembled form with the display annularly offset from its flow axis.

FIG. 2 illustrates a perspective view from the front of an example of the metering system 100. In this example, the meter unit 112 may embody a meter body 124 having a longitudinal axis L and a pair of inlet/outlets 126 that align on a flow axis F. The inlet/outlets 126 may interface with conduit 102 (FIG. 1) to allow material 104 (FIG. 1) to transit the interior of the meter body 124. The index unit 114 may be configured with mechanical and electronic components to render values for the flow volume (or generally, measured parameters) of fluid. The configurations may have a index housing 128 with a display 130 on the front. Examples of the display 130 may show alpha-numeric characters useful to convey information from and about the metering system 100 to the end user. The connective structures 120, 122 (FIG. 1) may be configured for the index housing 128 to secure to the meter body 124 so that the display 130 assumes an annular offset a as measured relative to the flow axis F. These configurations allow the housing 128 to "rotate" relative to the meter body 124, typically about the longitudinal axis L as generally denoted by the arrow enumerated R in the figure. This feature is particularly useful to position the display 130 for the end user to read but also accommodate annular positions of the meter body 124 necessary to couple the inlet/outlets 126 with conduit 102 (FIG. 1). In FIG. 2, the annular offset a of the display 130 assumes a value of approximately 0.degree.; however, this disclosure contemplates that the connective structures 120, 122 (or other structure) do not constrain the annular offset a to any pre-determined values or increments (e.g., 45.degree., 90.degree., etc.). In one implementation, the annular offset a of the display 130 may assume values of approximately 90.degree., 180.degree., and 270.degree. FIG. 3 depicts the metering system 100 of FIG. 2 with the annular offset a of the display 130 at approximately 90.degree.

Figure 4:
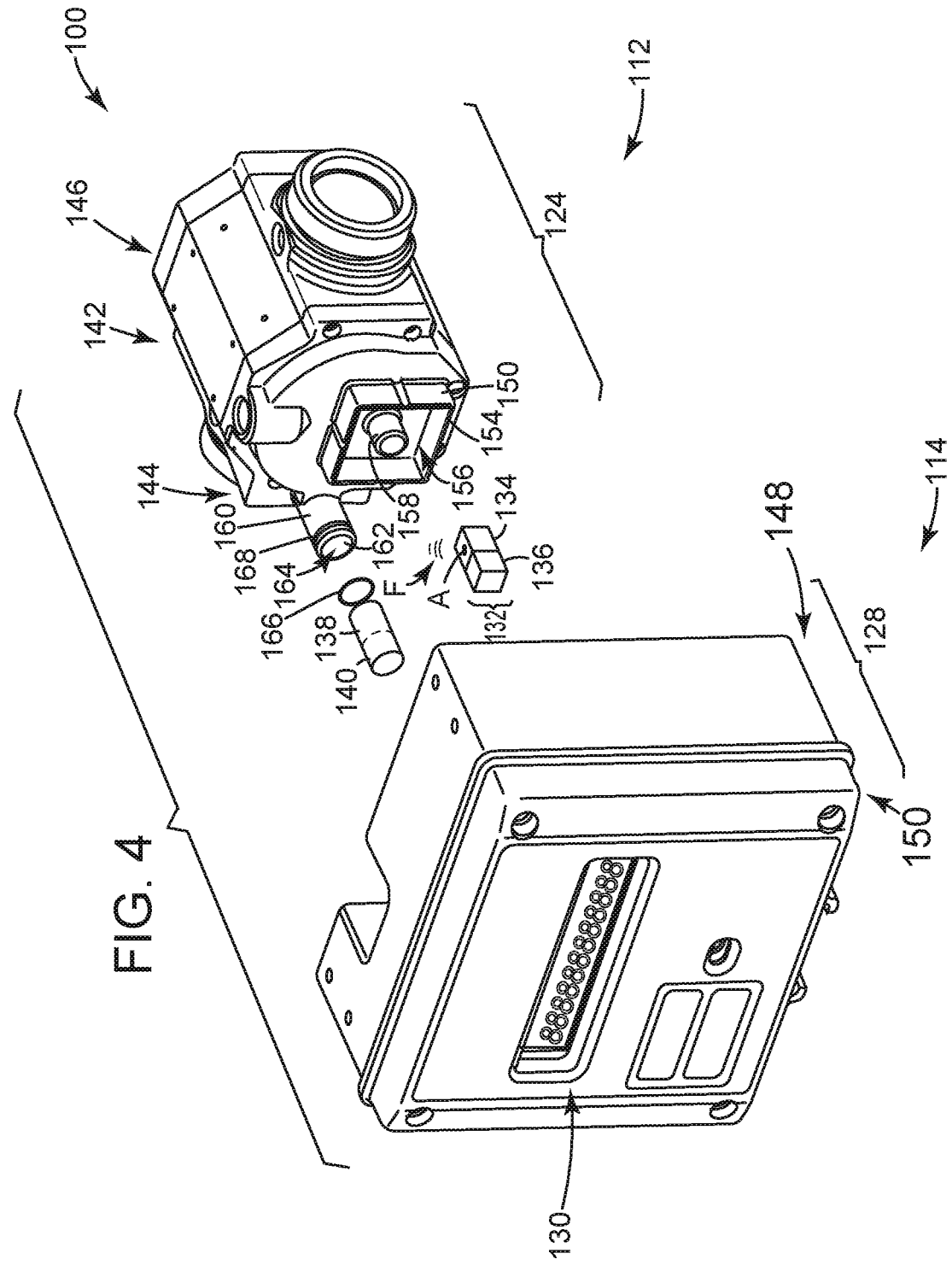
FIG. 4 depicts a perspective view of the front of the exemplary metering system of FIG. 2 in partially-exploded form.

FIG. 4 illustrates a perspective view of the front of the metering system 100 of FIG. 2 in partially-exploded form. The connective structure 120, 122 may exploit devices that readily facilitate the annular offset a of the display 130 but maintain the modular, water-tight design of the metering system 100. These devices may have a bifurcated structure so that part of the device is resident on each of the units 112, 114. In one implementation, the second connective structure 122 may include a non-contact sensor 132 with sensor parts (e.g., a first sensor part 134 and a second sensor part 136) that can convey information from the meter unit 112 to the indexing unit 114. The sensor parts 134, 136 may include devices that communicate without physical contact, preferably by magnetic fields but this disclosure is not limited to only that technology. In one implementation, the first sensor part 134 may have an active area A that can generate a field F (e.g., a magnetic field). Examples of the active area A may embody a magnet or device or material that can generate the requisite energy field or beam. The second sensor part 136 may generate a signal in response to changes in the field F.

The first watertight connective structure 120 may include a pair of connectors (e.g., a first connector 138 and a second connector 140). The connectors 138, 140 may be configured to releaseably engage with one another. Preference may be given to devices that do not require tools or tooling, but this is not always necessary or desirable. When engaged, the connectors 138, 140 can convey signals between the units 112, 114. These signals may originate from sensors that are responsive to various conditions (e.g., temperature, pressure, gas composition, relative humidity, etc.) in the meter body 124 or proximate the metering system 100.

The units 112, 114 may benefit from multi-piece designs for the meter body 124 and the index housing 128. Such designs may facilitate assembly and repair of the metering system 100. In one implementation, the meter body 124 may include a central cylinder 142 and a pair of covers (e.g., a first cover 144 and a second cover 146) that attach to opposing ends. The housing 128 may include a pair of housing sections (e.g., a first housing section 148 and a second housing section 150). Fasteners like bolts and screws may penetrate the covers 144, 146 and housing sections 148, 150 to ensure secure connection between these members. This connection may benefit from gaskets or o-rings, as well, to promote effective water-tight protection of internal components or compartments of the units 112, 114.

The meter body 124 and the housing 128 may also include integrated docking structures to facilitate proper use of the sensor parts 134, 136 and the connectors 138, 140 to form electrical and non-contact connections. On the meter body 124, the first cover 144 may include a first peripheral wall 152 that is disposed radially inwardly from the peripheral edge and possibly proximate the longitudinal axis L. The first peripheral wall 152 may have structure that forms an exposed, forward-facing edge 154. This structure may fully circumscribe a first area 156 of the first cover 144. Inside of the first area 156, the first cover 144 may include a first boss protrusion 158 that extends longitudinally way from the central cylinder 142. At or proximate the peripheral edge, the first cover 144 may include a second boss protrusion 160 that may extend generally longitudinally away from the central cylinder 142. The second boss protrusion 160 may have a bore 162 with an open, forward-facing end 164. An o-ring 166 may be disposed proximate the open end 164, residing in, for example, a groove 168. In this example, the boss protrusions 158, 160 are cylindrical, but other form factors are possible and, possibly, predicate on the preferred annular offset a or other factors that influence disposition of the meter body 124 on the process line. Acceptable form factors include cylinders or cylindrical bodies, but this disclosure contemplates other form factors (e.g., cubes or cuboids) that would comport with the design.

Figure 5:
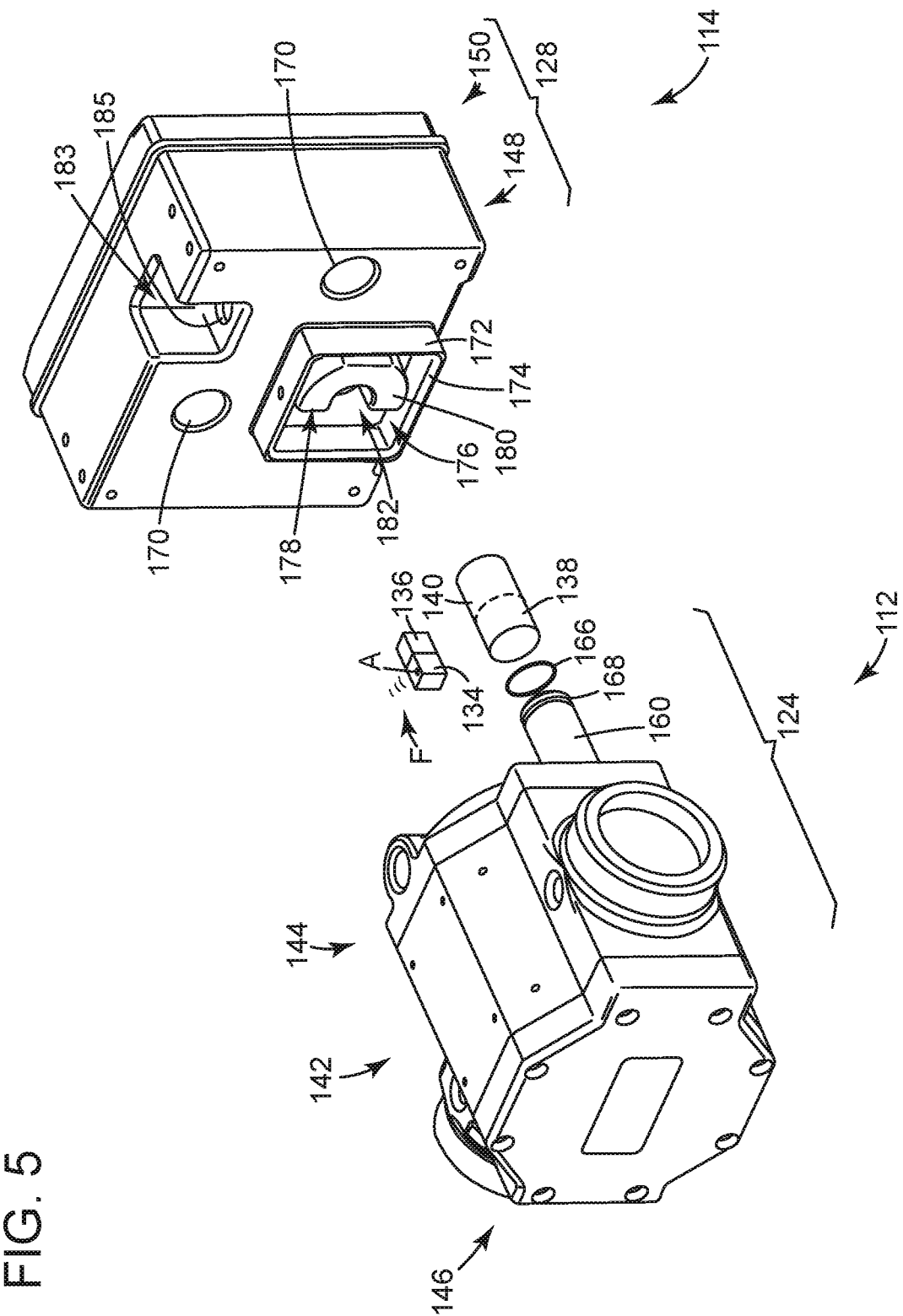
FIG. 5 depicts a perspective view of the back of the exemplary metering system of FIG. 2 in partially-exploded form.

FIG. 5 illustrates a perspective view of the back of the metering system 100 in partially-exploded form. The first housing section 148 may include one or more first apertures 170 that penetrate longitudinally into the structure of the index housing 128. The first housing section 148 may also include a second peripheral wall 172 with structure that forms an exposed, forward-facing edge 174. This structure may fully circumscribe a second area 176 of the first housing section 148. Inside of the second area 176, the first housing section 148 may include a protruding member 178, shown here in the form of a c-shaped body 180 having an open center 182. When assembled, the first boss protrusion 158 may insert into the open center 182 of the c-shaped body 180. The peripheral walls 152, 172 may overlap with one another so as to allow the forward-facing edges 154, 174 to contact or abut the first housing section 148 and the first cover 144, respectively. While not necessarily sealed, a gasket or o-ring may be disposed on the forward-facing edges 154, 174 to create a seal appropriate to prevent water penetration into the areas 156, 176. Geometry for the peripheral walls 152, 172 may be two-dimensionally square, but geometry that is circular or elliptical may also be acceptable, among others. The structure may form unitarily or monolithically with the first cover 144 so that fluid cannot ingress at the root or base into the areas 156, 176. In one implementation, the first housing section 148 may also have a partial recess 183 with an aperture 185 to provide access to the interior of the index housing 128. This feature can accommodate additional sensors, connectors for customer electronics (e.g., automated meter reading (AMR) devices), or like peripheral devices, as necessary.

Referring to both FIGS. 4 and 5, dimensions and geometry for the integrated docking structures on the units 112, 114 can vary as necessary to compliment particular applications for the metering system 100. Locations for the first apertures 170 may correspond with pre-determined values for the annular offset a of the display 130 to accommodate installation of the meter body 124. For example, alignment of the second boss protrusion 160 with either of the first apertures 170 accommodates positions for the meter body 124 at 0° or 90°, respectively. The index housing 128 may include additional first apertures 170 that accommodate other positions at, for example, 90° increments, although the first apertures 170 may also form slots or grooves that correspond with smaller and larger increments as well.

Internal dimensions for the bore 162 and the first aperture 170 can be configured to secure the connectors 138, 140 in the units 112, 114. An interference fit that is snug may be useful to secure the connectors 136, 138 in position on the device. This fit may also create a seal circumferentially about the device to prevent fluid ingress around the periphery of the connectors 138, 140. However, gaskets, o-rings, potting material, and sealants may also be used to close any intervening space so as to secure and seal the connectors 138, 140 in the respective structure as desired.

Figure 6:
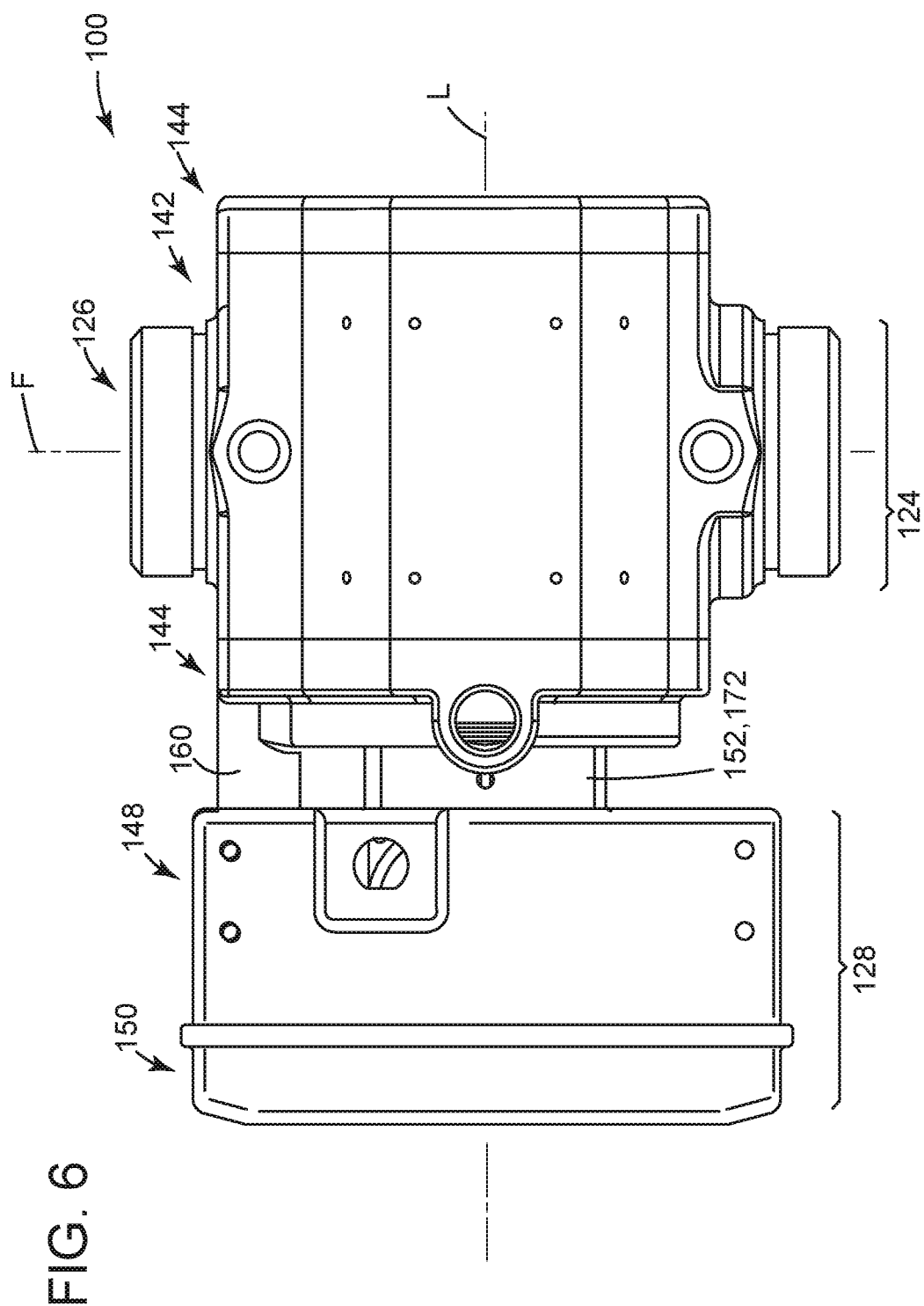
FIG. 6 depicts a plan view of the top of the exemplary metering system of FIG. 2.

FIG. 6 illustrates a plan view from the top of the metering system 100 of FIG. 2 in assembled form to inform the discussion, along with FIGS. 4 and 5, about assembly of the units 112, 114 into the metering system 100. The second peripheral wall 172 may circumscribe the first peripheral wall 152, but this is not always necessary or the case. A depth may be set for the bore 162 and first aperture 170 to receive a majority of the connectors 138, 140 along its longitudinal direction (or length). Preferably, the depth of the bore 162 will leave an end of the first connector 138 exposed from the first cover 144. The depth of the first apertures 170 will cause the end of the second connector 140 to sit inwardly from the back surface of the first housing section 148. In one implementation, the first boss protrusion 158 may extend into the first aperture 170 to afford proper electrical contact between the ends of connectors 138, 140 as well as to locate the o-ring 166 in contact with at least part of the first housing section 148.

Figure 7:
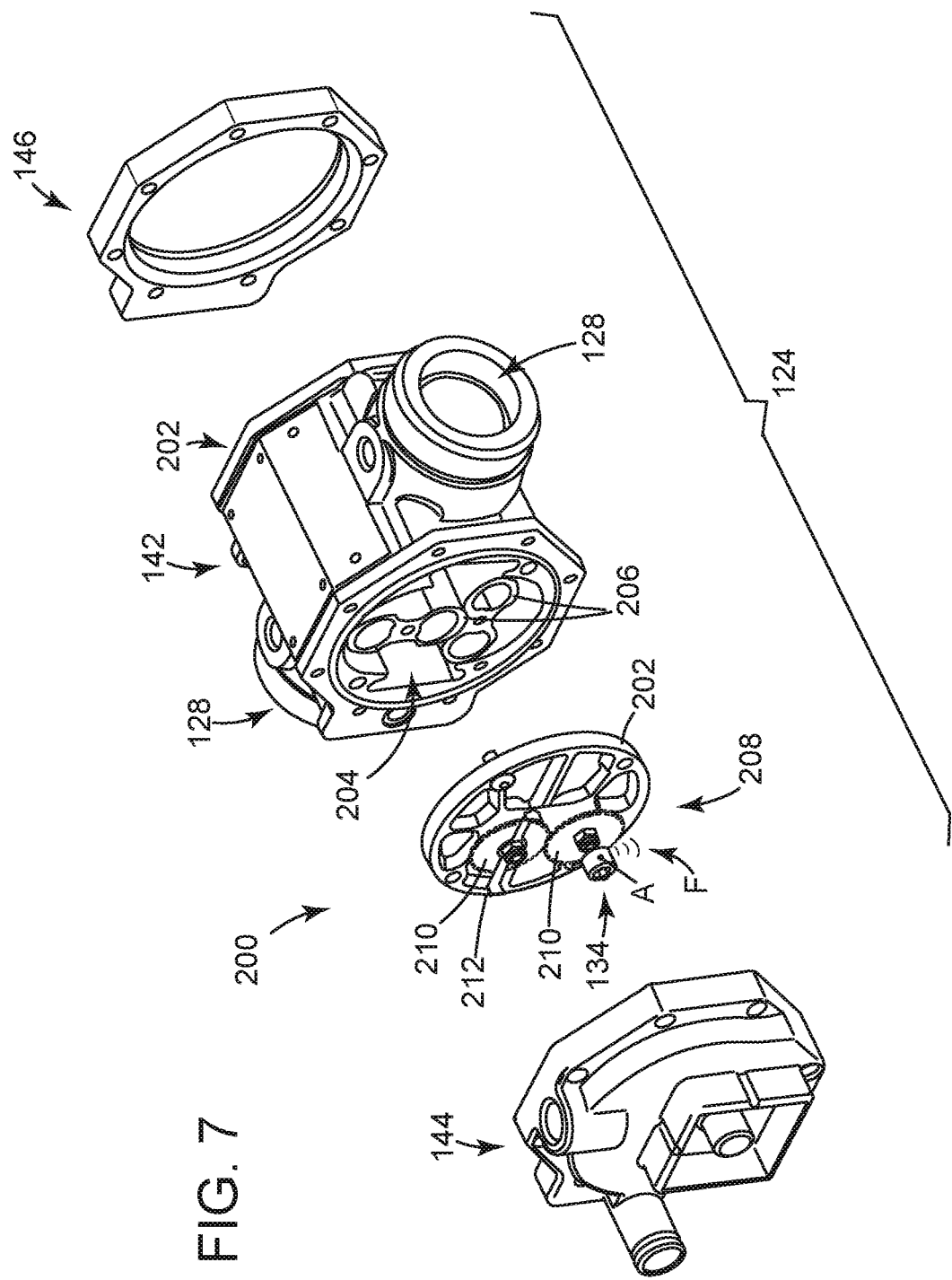
FIG. 7 depicts a perspective view of the front of an example of a meter unit for use in the metering system of FIG. 2 in partially-exploded form.

FIG. 7 shows a perspective view of the front of the metering system in partially-exploded form. Components like the index unit 116 are removed from view to focus the discussion on the meter body 124. In this regard, the central cylinder 142 can incorporate structural features (e.g., inlet/outlets 126) that may be useful for implementation of the device to provide accurate measurement of material 104 (FIG. 1). These structural features may be formed monolithically by casting, molding, extrusion, or like fabrication techniques. Also in FIG. 7, the meter body 124 may comprise a mechanical assembly 200 that may reside on the central cylinder 142. This assembly 200 may include cylinder end plates 202 that secure on opposite sides of the central cylinder 142. The end plates 202 enclose, provide bearing support, and form an inner cavity 204 with the central cylinder 142 that houses impellers 206. On the front end, the assembly 200 may also include a timing gear assembly 208 having a pair of gears 210. The gears 210 can couple with the impellers 206, typically by way of one or more shafts that extend through the cylinder end plates 202 to engage with the impellers 206 (that embody the measurement device 113 (FIG. 1)). A visual indicator 212 in the form of a bent, thin piece of metal can couple with one of the gears 210. The first sensor part 134 of the non-contact sensor 132 may couple with the other one of the gears 210. In this way, both the first sensor part 134 and the visual indicator 212 will co-rotate with the gears 210 as the impellers 206 rotate in response to fluid that transits the inlet/outlets 128.

Figure 8:
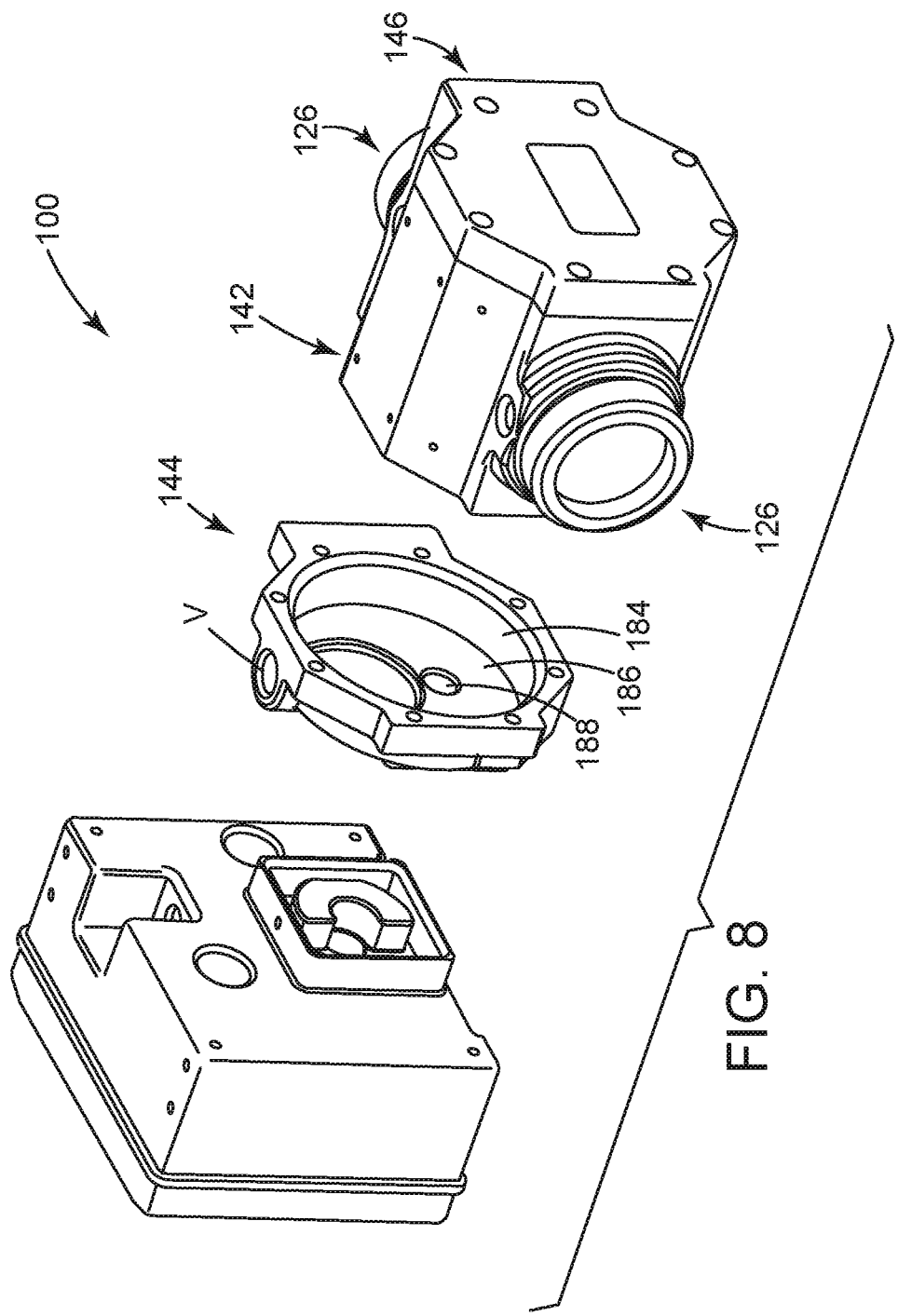
FIG. 8 depicts a perspective view of the back of the meter device of FIG. 7 in partially-exploded form.

FIG. 8 depicts a perspective view of the back of the metering system 100 in partially exploded form. The first cover 144 can have a recess 184 set radially inwardly from its outer peripheral edge or flange. The recess 184 may have a bottom 186 with a bore 188 that penetrate into the first boss protrusion 158 (FIG. 4). The bottom 186 may bounds an interior space formed with the first cover 144 in position on the central cylinder 142. This interior space may be deep enough for the gears 210 (FIG. 6) and visual indicator 212 to rotate without interference from the first cover 144. In one implementation configuration, the first sensor part 134 (FIG. 7) can insert into the bore 188. Preferably, dimensions for the bore 188 allows a clearance fit between the outer surface(s) of the first sensor part 134 and the inner surface of the bore 188. This fit is preferred so as not to impede rotation of the first sensor part 134, as discussed more below.

With reference to both FIGS. 7 and 8, the structure of the sensor parts 134, 136 of the non-contact sensor 132 is useful to transfer rotation of the impellers 206 through the wall thickness of the first boss protrusion 158 and protruding member 178. Examples of the non-contact sensor 132 that use magnetic field F may prefer that the walls the first boss protrusion 158 and protruding member 178 comprises aluminum, having a thickness that is collectively situated to allow the magnetic field F to properly penetrate at sufficient flux levels to stimulate the second sensor part 136. In operation, the impellers 206 turn in response to flow of material 104 (FIG. 1) through the meter body 124 via inlet/outlets 128. The impellers 206 rotate the gears 210 and, by consequence, turn the first sensor part 134 to radially displace the active area A. The second sensor part 136 can be configured to react to changes in the magnetic field F from the active area A to generate a signal. The index unit 114 can use this signal to generate a value that corresponds with the flowing volume of material 104 (FIG. 1) that transits the inner cavity 204. In one implementation, the visual indicator 212 also rotates to allow the end user to visually verify operation of the metering system 100 through a viewing window (e.g., viewing window V).

Figure 9:
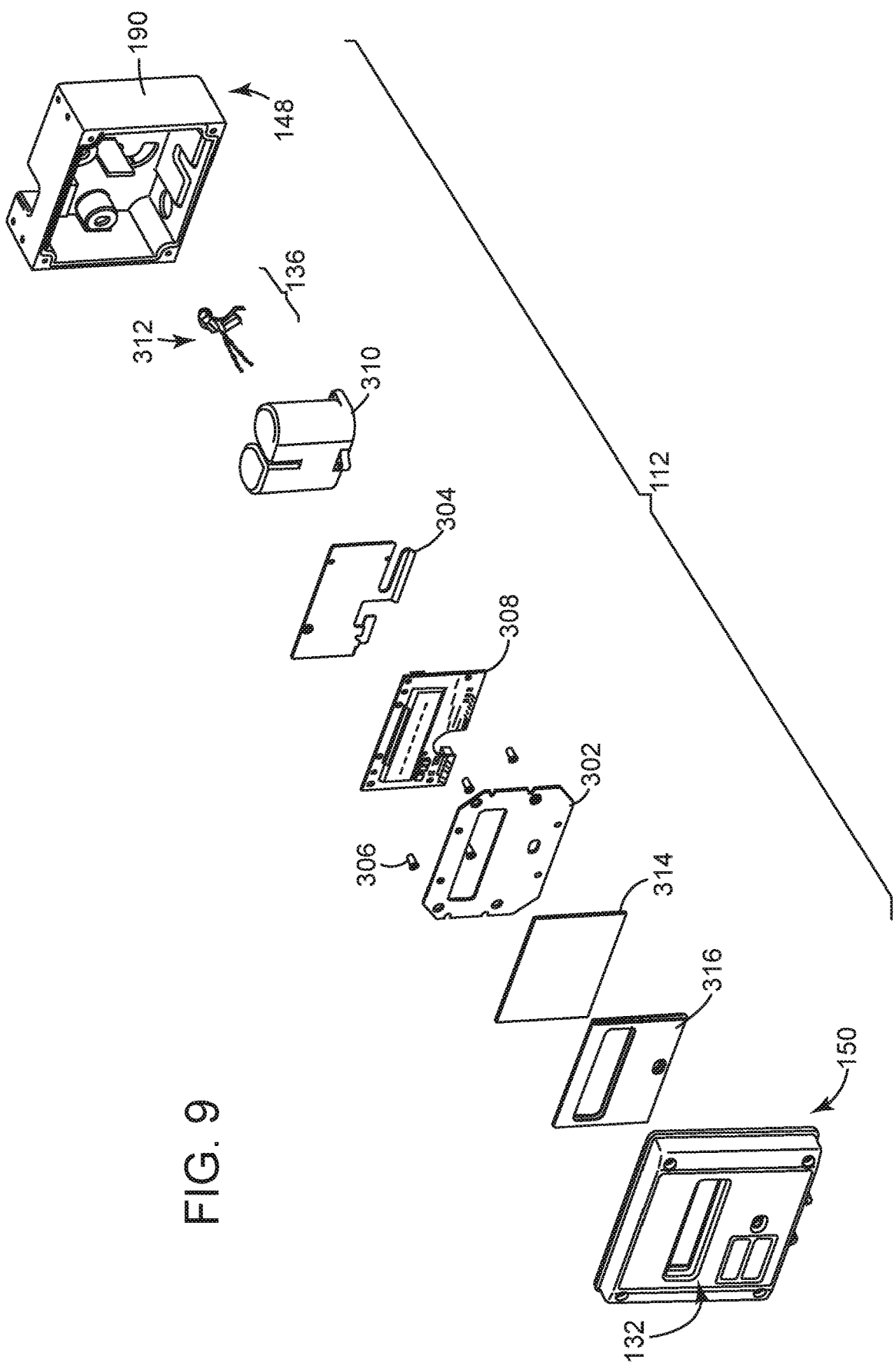
FIG. 9 depicts a perspective view of the front of an example of a index unit for use in the metering system of FIG. 2 in partially-exploded form.

FIG. 9 illustrates a perspective view of the front of the index unit 114 in partially-exploded form. As shown, the index unit 114 houses electronic components; however as noted herein this feature does not exclude mechanical or mechanical/electronic components as well. The first housing section 148 may include sides 190 that integrate together into a box or box-like structure. This box structure can form an interior cavity. In one implementation, the second housing section 150 locates in position on the first housing section 148 to enclose the interior cavity. Materials for use to form the housing sections 148, 150 likely need to resist corrosion and not degrade to maintain integrity of the metering system 100 underwater or submerged in fluid for extended periods of time. These materials may include plastics and composites, but metals may also suffice. Casting, molding, and machining may be useful manufacturing techniques to form the sections 148, 150 as monolithic units or piece parts that are assembled together by fasteners to all for ready access to the interior cavity. In one implementation, the index unit 114 may include an electronics assembly that resides in the interior cavity and, as noted above, featuring electronic components. This configuration may include brackets (e.g., a first bracket 302 and a second bracket 304) and standoffs 306 that support a circuit board 308 and power source 310 (e.g., battery). The electronics assembly may also include a Wiegand sensor 312, which operates as the second sensor part 136 of the sensor 138 for non-contact transfer of rotation of the impellers 206 (FIG. 7) as a measure of flow, discussed above. Viewing glass 314 and glass retaining mount 316 may also be included to allow visualization of the display 132. Gaskets and o-rings may be useful about the exposed edges of the housing sections 148, 150 and viewing glass 314 for ensuring that the housing 128 maintains its water-tight seal to protect the electronics assembly in submerged environments.

Figure 10:
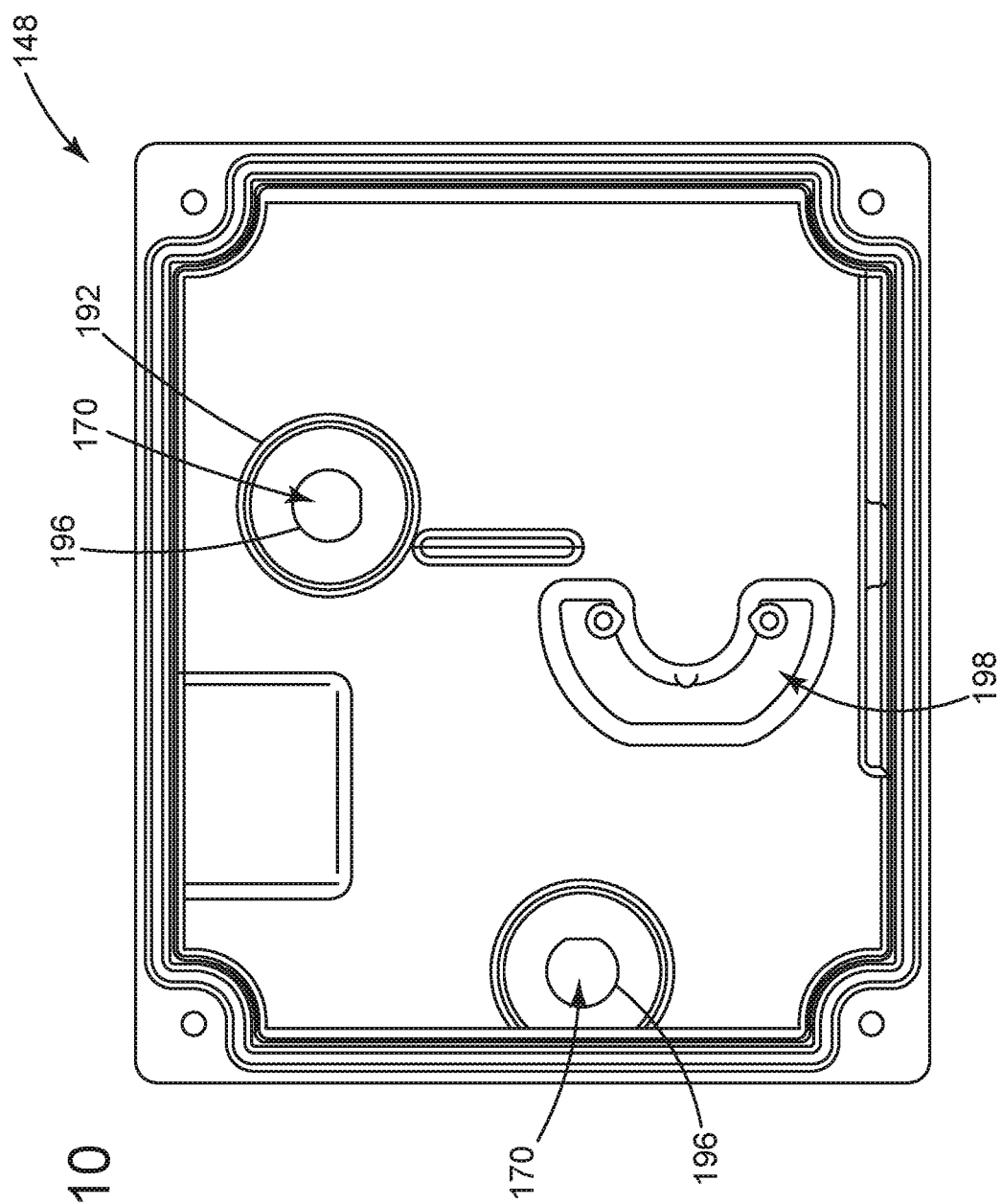
FIG. 10 depicts an elevation view of the front of the index unit of FIG. 9 in partially-assembled form.

With references now to FIG. 10, and looking inside of the interior cavity of the box-like structure, the first housing section 148 may be configured to integrate the parts of the connective structure 120, 122. These configurations may include one or more boss features (e.g., a first boss feature 192 and a second boss feature 194). The boss features 192, 194 correspond with the first aperture 170, which were discussed earlier as penetrating the first housing section 148 from the back of the first housing section 148. The boss features 192, 194 may include an opening 196 that exposes the first apertures 170 to the interior cavity. The opening 196 is useful for cables and wiring to couple the second connector 140 to the electronics assembly 300. The first housing section 148 may also include a c-shaped aperture 198 that penetrates into the bottom side 190. The c-shaped aperture 198 forms a housing to receive the Wiegand sensor 312, possibly conforming to the shape of the c-shaped body 180 of the protruding member 180.

In light of the foregoing discussion, the embodiments herein incorporate improvements to make metering systems, for example, gas meters, water-tight and configurable for use in a variety of applications. The proposed structure is also effective to modularize the device with parts that are removeable and replaceable with little effort. This feature makes the device easy to service its respective constituent components, while at the same time maintaining integrity of the device to submerge in fluid environments.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Examples follow below include certain elements or clauses one or more of which may be combined with other elements and clauses describe embodiments contemplated within the scope and spirit of this disclosure.

What is claimed is:

1. A metering system, comprising:
a meter unit comprising a meter body with an inlet and an outlet aligned on a flow axis and a measurement device disposed therein;
an index unit with an index housing enclosing an electronics assembly to generate a value that equates operation of the measurement device with a parameter of the material flow; and
a connective interface having a first part and a second part, one each formed integrally with a cover on the meter body and with the index housing, respectively, the first part and the second part formed to physically connect with one another to provide data to the electronics assembly, the data corresponding with operating conditions on the meter unit and operation of the measurement device,
wherein the first part and the second part have structures that overlap with one another when the index unit mates with the meter unit so that the meter unit and the index unit are operable underwater to generate the value.

2. The metering system of claim 1, wherein the first part and the second part are configured for the index unit to secure to the meter unit in a position that is annularly offset from the flow axis so as to change orientation of the index unit relative to the meter body.

3. The metering system of claim 1, wherein the index unit is individually sealed to prevent ingress of fluid so as to allow the index unit to remove from the meter body underwater.

4. The metering system of claim 1, wherein the first part and the second part comprise a non-contact sensor that couples with the measurement device.

5. The metering system of claim 1, wherein the first part and the second part comprise watertight docking connectors disposed on each of the meter unit and the index unit, and wherein the connectors integrate with one another to transmit data corresponding with the operating conditions on the meter unit.

6. The metering system of claim 5, wherein the meter unit comprises a sensor coupled with the connectors, and wherein the sensor is configured to generate a signal in response to the operating conditions on the meter unit.

7. A gas meter, comprising:
an index housing;
a meter body releaseably coupled to the index housing, the meter body comprising
a central cylinder with an interior cavity and a pair of inlet/outlets aligned on a flow axis, and
covers attached to opposite ends of the central cylinder, the covers comprising a first cover having a first side facing outwardly toward the index housing to receive the index housing and a second side facing inwardly toward the interior cavity of the central cylinder, the first side having a first boss protrusion and a second boss protrusion, each extending perpendicular to the flow axis and longitudinally away from the central cylinder to an end proximate the index housing, the first side further having a peripheral wall extending perpendicular to the flow axis and longitudinally away from the central cylinder, the peripheral wall circumscribing the first boss protrusion and extending longitudinally away from the central cylinder, the second side having a bore terminating inside of the first boss protrusion;
a pair of impellers disposed in the interior cavity of the central cylinder;
a magnet coupled with the pair of impellers, the magnet located in the bore so as to reside in first boss protrusion; and
a connector disposed in the second boss protrusion, the connector having an end exposed outside of the first cover.

8. The gas meter of claim 7, wherein the second boss protrusion has a bore sized to receive and form a seal circumferentially about the connector.

9. The gas meter of claim 7, further comprising:
an o-ring circumscribing the second boss protrusion.

10. The gas meter of claim 7, further comprising:
an electronics assembly disposed in the index housing,
wherein the electronics assembly is configured to generate a value that equates rotation of magnet with a parameter of the material flow.

11. The gas meter of claim 7, wherein the index housing has an aperture configured to receive at least a portion of the second boss protrusion.

12. The gas meter of claim 7, wherein the index housing has an opening to receive at least a portion of the first boss protrusion so as to locate the magnet proximate a Wiegand sensor.

13. The gas meter of claim 7, wherein the index housing is configured to secure to the front cover in at least two orientations that define a position for the display, the position in at least one of the two orientations being annularly offset from the flow axis.

14. A gas meter, comprising:
a meter body;
an index housing releaseably coupled to the meter body, the index housing separable into two pieces, a front and a back, the front piece having a display, the back piece comprising walls integral with each other to form a cavity accessible by removing the front piece, the walls including a first wall forming the back of the index housing that is proximate the meter body, the first wall having a side exposed to the meter body, the side having a protruding member extending longitudinally away from the exposed side of the first wall towards the meter body, the first wall having a first aperture penetrating from inside of the cavity and terminating in the protruding member and a second aperture penetrating from outside of the cavity into the index housing to form an opening accessible from the back of the index housing;
an electronics assembly disposed in the cavity, the electronics assembly configured to generate a value for a parameter of material flow in the meter body;
a sensor disposed in the first aperture and resident in the protruding member and coupled with the electronics assembly; and
a connector disposed in the second aperture and coupled with the electronics assembly, the connector having an end exposed from the first wall proximate the first opening at the back of the index housing.

15. The gas meter of claim 14, wherein the protruding member has a c-shaped body that partially circumscribes an open center.

16. The gas meter of claim 14, further comprising:
a peripheral wall on the first wall, the peripheral wall circumscribing the protruding member and extending longitudinally away from the back of the index housing.

17. The gas meter of claim 14, further comprising:
a connector disposed on the meter body, the connector on the meter body configured to connect to the connector on the index housing.

18. The gas meter of claim 17, wherein the meter body has a boss protrusion with a bore to receive the connector, and wherein the boss protrusion extends into the aperture on the index housing.

19. The gas meter of claim 14, further comprising:
a pair of impellers disposed in the meter body; and
a magnet coupled with the pair of impellers,
wherein the sensor comprises a Wiegand sensor that is configured to generate a signal in response to rotation of the magnet.

* * * * *